(12) United States Patent
Song et al.

(10) Patent No.: US 10,067,396 B2
(45) Date of Patent: Sep. 4, 2018

(54) LIQUID CRYSTAL DISPLAY

(71) Applicant: Samsung Display Co. Ltd., Yongin-si (KR)

(72) Inventors: Dong Han Song, Hwaseong-si (KR); Su Jin Kim, Seoul (KR); Ki Chul Shin, Seongnam-si (KR); Dong Chul Shin, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 47 days.

(21) Appl. No.: 15/250,101

(22) Filed: Aug. 29, 2016

(65) Prior Publication Data
US 2017/0146832 A1   May 25, 2017

(30) Foreign Application Priority Data
Nov. 19, 2015   (KR) .......................... 10-2015-0162649

(51) Int. Cl.
*G02F 1/137* (2006.01)
*G02F 1/133* (2006.01)
(Continued)

(52) U.S. Cl.
CPC .......... *G02F 1/137* (2013.01); *G02F 1/13306* (2013.01); *G02F 1/13725* (2013.01); *G02F 1/133536* (2013.01); *G02F 1/133711* (2013.01); *G02F 1/13439* (2013.01); *G02F 1/133504* (2013.01); *G02F 1/133512* (2013.01);
(Continued)

(58) Field of Classification Search
CPC ....................................................... G02F 1/137
See application file for complete search history.

(56) References Cited

U.S. PATENT DOCUMENTS

| | | | | |
|---|---|---|---|---|
| 2012/0038852 | A1* | 2/2012 | Jang | G02F 1/1334 349/86 |
| 2012/0194763 | A1* | 8/2012 | Cheong | G02F 1/133555 349/62 |

(Continued)

FOREIGN PATENT DOCUMENTS

| | | |
|---|---|---|
| JP | 2004069835 | 3/2004 |
| JP | 2011069921 | 4/2011 |

(Continued)

OTHER PUBLICATIONS

Joon Heo, et al., "Fast-switching initially-transparent liquid crystal light shutter with crossed patterned electrodes", AIP Advances, vol. 5, pp. 047118-047118-7, (2015).

(Continued)

*Primary Examiner* — Edmond Lau
(74) *Attorney, Agent, or Firm* — Cantor Colburn LLP (57) ABSTRACT

A liquid crystal display includes: a display panel including first and second substrates opposite to each other, and a liquid crystal layer disposed between the first and second substrates; a reflective polarizer disposed outside the first substrate; and a backlight unit disposed outside the first substrate to provide light to the display panel, where the liquid crystal layer includes liquid crystal molecules and dichroic dye molecules, and the liquid crystal layer has a first arrangement state in which the liquid crystal molecules and the dichroic dye molecules are arranged at random.

15 Claims, 10 Drawing Sheets

(51) Int. Cl.
  *G02F 1/1337* (2006.01)
  *G02F 1/1335* (2006.01)
  *G02F 1/1343* (2006.01)
  *G02F 1/1362* (2006.01)

(52) U.S. Cl.
  CPC .. *G02F 1/133514* (2013.01); *G02F 1/134309* (2013.01); *G02F 1/136286* (2013.01); *G02F 2001/133742* (2013.01); *G02F 2201/121* (2013.01); *G02F 2201/123* (2013.01); *G02F 2202/04* (2013.01)

(56) References Cited

U.S. PATENT DOCUMENTS

2012/0257123 A1\* 10/2012 Lee .................. B60R 1/088
                                                    349/1
2012/0300496 A1\* 11/2012 Chang .................. G02B 6/002
                                                    362/609

FOREIGN PATENT DOCUMENTS

| KR | 1020120089082 | 8/2012 |
| KR | 101482625 | 1/2015 |

OTHER PUBLICATIONS

T. Maeda, et al., "Reflective and transflective color LCDs with double polarisers", Journal of the SID, (1999), pp. 1-9.
Yi-Hsin Lin, et al., "P-152: High Performance Reflective and Transflective Displays Using Guest-Host Liquid Crystal Gels", SID Digest, (2006), pp. 780-782.

\* cited by examiner

LIQUID CRYSTAL DISPLAY

This application claims priority to Korean Patent Application No. 10-2015-0162649, filed on Nov. 19, 2015, and all the benefits accruing therefrom under 35 U.S.C. § 119, the content of which in its entirety is herein incorporated by reference.

BACKGROUND

1. Field

Embodiments of the invention relate to a liquid crystal display.

2. Description of the Related Art

A liquid crystal display, which is one of the most widely used types of flat panel display, typically includes two substrates including field generating electrodes, such as a pixel electrode and a common electrode, and a liquid crystal layer disposed between the two substrates. The liquid crystal display may be configured in a way such that a voltage is applied to the field generating electrodes to generate an electric field in the liquid crystal layer, and thus the alignment of liquid crystal molecules in the liquid crystal layer is determined to control the polarization of incident light, thereby displaying an image. Such a liquid crystal display includes a reflective liquid crystal display and a transmissive liquid crystal display according to the kind of employed light sources. The transmissive liquid crystal display may be configured in a way such that a panel retaining liquid crystals for electro-optical switching is disposed between a pair of transparent substrates, a backlight unit, which is a light source, is disposed at the rear of the panel, and an image is observed from the front of the panel. In such a transmissive liquid crystal display, a backlight unit is used, and the backlight unit typically consumes a large amount of power. Therefore, the transmissive liquid crystal display may not be effectively applied to mobile appliances of which battery is a primary power source.

The reflective liquid crystal display may be configured in a way such that a reflector is disposed at the rear of the panel, incident light emitted from the front of the panel is used as reflected light, thereby displaying an image. Since the reflective liquid crystal display, unlike the transmissive liquid crystal display, may not include a backlight unit for supplying light, the reflective liquid crystal display may have a small amount of power consumption compared to the transmissive liquid crystal display, and thus the reflective liquid crystal display may be effectively used for mobile appliances. However, the reflective liquid crystal display may have time and place restrictions due to dependency on ambient conditions.

SUMMARY

Recently, a semi-transmissive liquid crystal display has been proposed to overcome the defects of such reflective and transmissive liquid crystal displays described above. The semi-transmissive liquid crystal display is generally utilized in mobile appliances due to no time and place restrictions and relatively low battery power consumption thereof.

However, in such a semi-transmissive liquid crystal display, a technology of implementing a composite mode in a single cell gap and a technology of applying a dual cell gap to a single mode use complicated processes, and separate transmission and reflection regions are provided in one pixel, such that aperture ratio may be lowered.

Therefore, recently, research for a reflective-transmissive liquid crystal display capable of realizing both a reflection mode using external light and a transmission mode using a backlight unit without separate transmission and reflection regions has actively been conducted.

Embodiments of the invention relate to a liquid crystal display, which operates in both a reflection mode and a transmission mode.

Embodiments of the invention relate to a liquid crystal display, which realizes black gradation using only a single reflective polarizer.

Aspects of the invention relate to a liquid crystal display, which may be manufactured with reduced cost without performing an alignment film forming process because an alignment film is not used therein According to an embodiment of the invention, a liquid crystal display includes: a display panel including a first substrate and a second substrate opposite to each other, and a liquid crystal layer disposed between the first substrate and the second substrate; a reflective polarizer disposed outside the first substrate; and a backlight unit disposed outside the first substrate to provide light to the display panel. In such an embodiment, the liquid crystal layer includes liquid crystal molecules and dichroic dye molecules, and has a first arrangement state in which the liquid crystal molecules and the dichroic dye molecules are arranged at random.

In an embodiment, the display panel may realize black gradation when the backlight unit is turned on in the first arrangement state.

In an embodiment, the display panel may realize black gradation when the backlight unit is turned off in the first arrangement state.

In an embodiment, the liquid crystal layer may has a second arrangement state in which the liquid crystal molecules and the dichroic dye molecules are arranged vertically.

In an embodiment, the display panel may realize white gradation when the backlight unit is turned on in the second arrangement state.

In an embodiment, the display panel may realize white gradation when the backlight unit turned on in the second arrangement state.

In an embodiment, the liquid crystal layer may be in the first arrangement state when an electric field is not generated in the liquid crystal layer.

In an embodiment, the liquid crystal layer may be converted into the second arrangement state when an electric field is generated in the liquid crystal layer.

In an embodiment, the liquid crystal display may further include: an alignment film disposed on the first substrate.

In an embodiment, the liquid crystal layer may be in the second arrangement state when an electric field is not generated in the liquid crystal layer.

In an embodiment, the liquid crystal layer may be converted into the first arrangement state when a horizontal electric field is generated in the liquid crystal layer.

In an embodiment, the reflective polarizer may transmit light vibrating in a first direction, and may reflect light vibrating in a second direction different from the first direction.

In an embodiment, the first direction and the second direction may be orthogonal to each other.

In an embodiment, the liquid crystal display may further include: a light absorbing layer disposed outside the backlight unit.

In an embodiment, the dichroic dye particles may include black dye particles.

BRIEF DESCRIPTION OF THE DRAWINGS

The above and other features of the invention will become more apparent by describing in detail exemplary embodiments thereof with reference to the attached drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 1:
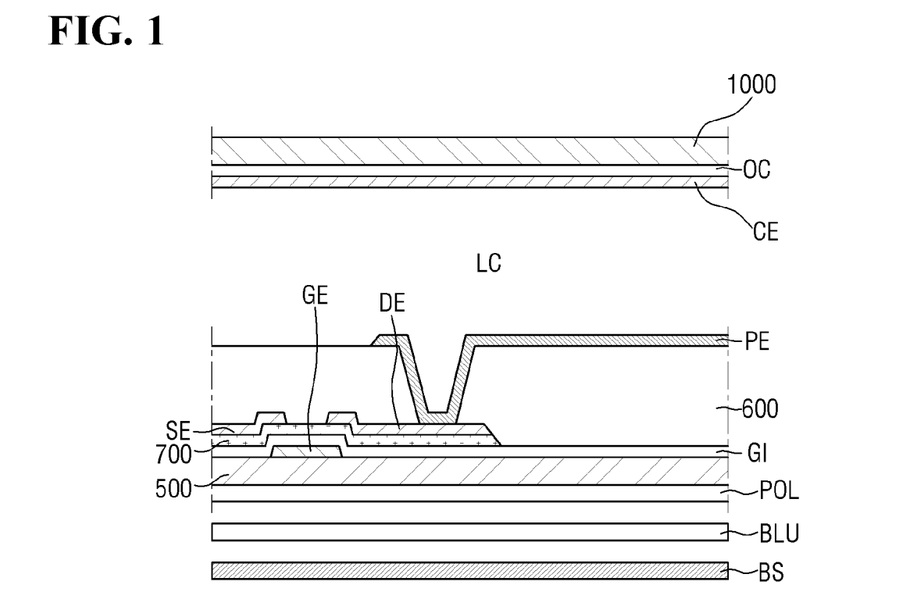
FIG. 1 is a schematic cross-sectional view of a liquid crystal display according to an embodiment of the invention.

FIG. 1 is a schematic cross-sectional view of a liquid crystal display according to an embodiment of the invention. FIGS. 2 to 5 are cross-sectional views showing a driving operation of the liquid crystal display of FIG. 1.

Referring to FIGS. 1 to 5, an embodiment of the liquid crystal display according to the invention includes: a display panel including a first substrate 500 and a second substrate 1000 facing each other, and a liquid crystal layer LC disposed between the first substrate 500 and the second substrate 1000; a reflective polarizer POL disposed outside (e.g., below) the first substrate 500; and a backlight unit BLU disposed outside the first substrate 500 (e.g. below) to provide light to the display panel.

In such an embodiment, referring to FIG. 1, the first substrate 500 may include or include or be made of a material having heat resistance and transmissivity. In one embodiment, for example, the first substrate 500 may include or be made of transparent glass or plastic, but the material is not limited thereto. A display area for displaying an image and a non-display area provided with various signal lines for allowing the display area to display an image may be defined on the first substrate 500.

A gate electrode GE may be disposed on the first substrate 500. Although not shown in the drawing, the gate electrode GE may be defined by a branched portion of a gate line of a plurality of gate lines extending in a predetermined direction.

The gate electrode GE may constitute the three terminals of a thin film transistor together with a source electrode SE and a drain electrode DE to be described later.

The gate electrode GE may include one or more of aluminum (Al)-based metal including an aluminum alloy, silver (Ag)-based metal including a silver alloy, copper (Cu)-based metal including a copper alloy, molybdenum (Mo)-based metal including a molybdenum alloy, chromium (Cr), titanium (Ti), and tantalum (Ta). However, the materials listed above are merely exemplary, the material of the gate electrode GE is not limited thereto, and metal or a polymer material having performance high enough to attain a desired display device may be used as the material of the gate electrode GE.

The gate electrode GE may have a single film structure, but is not limited thereto. Alternatively, the gate electrode GE may have a double film structure, a triple film structure, or a multiple film structure including three or more films.

A gate insulating film GI may be disposed on the gate electrode GE. The gate insulating film GI may cover the gate electrode GE and be formed on the entire surface of the first substrate 500.

At least one material selected from inorganic insulating materials, such as silicon oxide (SiOx) and silicon nitride (SiNx), and organic insulating materials, such as benzocyclobutene ("BCB"), an acryl-based material, and polyimide may be used, e.g., mixed, to form the gate insulating film GI. However, the aforementioned materials are merely exemplary, and the material of the gate insulating film GI is not limited thereto.

A semiconductor pattern layer 700 may be disposed on the gate insulating film GI.

The semiconductor pattern layer 700 may include amorphous silicon or polycrystalline silicon. However, the semiconductor pattern layer 700 is not limited thereto. Alternatively, the semiconductor pattern layer 700 may include an oxide semiconductor.

The semiconductor pattern layer 700 may have various shapes such as an island shape and a line shape. In an embodiment, where the semiconductor pattern layer 700 has the line shape, the semiconductor pattern layer 700 may be located beneath a data line (not shown) to extend to the upper portion of the gate electrode GE.

In an embodiment, the semiconductor pattern layer 700 may be patterned to have substantially the same shape as data wires SE and DE to be described later in a region other than a channel unit. In such an embodiment, the semiconductor pattern layer 700 may be disposed to overlap the data wires SE and DE in the entire region other than the channel unit. The channel unit may be disposed between the source electrode SE and the drain electrode DE facing each other. The channel unit electrically connects the source electrode SE and the drain electrode DE, and the shape thereof is not limited to a specific shape.

In an embodiment, an ohmic contact layer (not shown) doped with an n-type impurity at a high concentration may be disposed on the semiconductor pattern layer 700. The ohmic contact layer may overlap the entire semiconductor pattern layer 700 or a part of the semiconductor pattern layer 700. However, in an embodiment in which the semiconductor pattern layer 700 includes an oxide semiconductor, the ohmic contact layer may be omitted.

In an embodiment, where the semiconductor pattern layer 700 is an oxide semiconductor layer, the semiconductor pattern layer 700 may include zinc oxide (ZnO). In such an embodiment, the semiconductor pattern layer 700 may be doped with one or more kinds of ions selected from gallium (Ga), indium (In), tin (Sn), zirconium (Zr), hafnium (Hf), cadmium (Cd), silver (Ag), copper (Cu), germanium (Ge), gadolinium (Gd), titanium (Ti), and vanadium (V). In one embodiment, for example, the semiconductor pattern layer 700, which is an oxide semiconductor layer, may include one or more selected from ZnO, ZnGaO, ZnInO, ZnSnO, GaInZnO, CdO, InO, GaO, SnO, AgO, CuO, GeO, GdO, HfO, TiZnO, InGaZnO, and InTiZnO. However, these oxides listed above are merely exemplary, and the kind of oxide semiconductors is not limited thereto.

A source electrode SE and a drain electrode DE may be disposed on the semiconductor pattern layer 700. The source electrode SE may be defined by branched portion of a data line of a plurality of data lines extending in a direction crossing the gate line. The drain electrode DE is spaced apart from the source electrode SE, and is disposed on the semiconductor pattern layer 700 to face the source electrode SE around the gate electrode GE or the channel unit.

Each of the source electrode SE and the drain electrode DE may have a single film structure or a multiple film structure, including or made of nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se) or tantalum (Ta). In an embodiment, alloys of the above metals or one or more material selected from Titanium (Ti), zirconium (Zr), tungsten (W), tantalum (Ta), niobium (Nb), platinum (Pt), hafnium (Hf), oxygen (O), and nitrogen (N) may be used to form the source electrode SE or the drain electrode DE.

A passivation film 600 may be disposed on the source electrode SE, the drain electrode DE and the semiconductor pattern layer 700. The passivation film is a planarizing film, and covers the source electrode SE, the drain electrode DE and the semiconductor pattern layer 700. The passivation film 600 may include an inorganic insulating material. In one embodiment, for example, the inorganic insulating material of the passivation film may include at least one selected from silicon oxide, silicon nitride, silicon oxynitride, aluminum oxynitride, titanium oxynitride, zirconium oxynitride, hafnium oxynitride, tantalum oxynitride and tungsten oxynitride. However, these inorganic insulating materials are merely exemplary, and the material of the passivation film 600 is not limited thereto.

In an alternative embodiment, a color filter may be disposed the source electrode SE, the drain electrode DE and the semiconductor pattern layer 700, instead of the passivation film 600. In such an embodiment, the liquid crystal display may be a color filter on array ("COA") type liquid crystal display.

In an embodiment, a contact hole that exposes a part of the drain electrode DE may be defined in the passivation film 600. In such an embodiment, the contact hole penetrates or is formed through the passivation film 600 to expose the upper surface of the drain electrode DE.

A pixel electrode PE may be disposed on the passivation film 600. The pixel electrode PE may be electrically connected to the drain electrode DE through the contact hole defined in the passivation film 600. In such an embodiment, the pixel electrode PE may include or be made of a transparent conductor, such as indium tin oxide ("ITO") or indium zinc oxide ("IZO"), or a reflective conductor, such as aluminum.

A liquid crystal layer LC to be described later may be disposed on the pixel electrode PE. In such an embodiment, liquid crystal molecules 80 and dichroic dye particles 70 disposed in the liquid crystal layer LC may be arranged at random in a specific mode. In such an embodiment, an alignment film may not be disposed on the pixel electrode PE. In such an embodiment, the pixel electrode PE and the liquid crystal layer LC may be directly in contact with each other.

The second substrate 1000 may be disposed to face the first substrate 500.

The second substrate 1000 may include or be made of a material having heat resistance and transmissivity. In one embodiment, for example, the second substrate 1000 may include or be made of transparent glass or plastic, but the material is not limited thereto.

Although not shown in the drawing, a black matrix and a color filter may be disposed on the second substrate 1000. The black matrix serves to effectively prevent or to suppress the light leakage between pixels and the light interference between adjacent pixels. The black matrix may be disposed to overlap the source electrode SE, drain electrode DE and semiconductor pattern layer 700 disposed on the first substrate 500. In such an embodiment, the black matrix may cover the data lines and/or gate lines.

The color filter may be disposed to overlap the pixel electrode PE of each pixel. The color filter may include a red color filter, a blue color filter or a green color filter.

In an alternative embodiment, the color filter and/or the black matrix may be omitted. In another alternative embodiment, the color filter and/or the black matrix may be disposed on the first substrate 500.

An overcoat film OC may be disposed on the color filter and the black matrix. The overcoat film OC may include or be made of an organic or inorganic insulating material. The overcoat film OC may be disposed to cover or formed over the entire region of the second substrate 1000, and may function as a planarizing film.

A common electrode CE may be disposed on the overcoat film OC. The common electrode CE may be a front electrode that is not patterned. A common voltage may be applied to the common electrode CE. When voltages different from each other are respectively applied to the common electrode CE and the pixel electrode PE, an electric field is generated between the common electrode CE and the pixel electrode PE, and the movement of liquid crystals disposed between the first substrate 500 and the second substrate 1000 may be controlled by using the electric field.

A liquid crystal layer LC may be disposed between the first substrate 500 and the second substrate 1000.

The liquid crystal layer LC may include a plurality of liquid crystal molecules 80 and a plurality of dichroic dye particles 70. The movement of the liquid crystal molecules 80 and the dichroic dye particles 70 corresponding to an electric field generated therein will be described in detail with reference to FIGS. 2 to 5

The dichroic dye particles 70 may absorb the light provided to the liquid crystal layer LC. The dichroic dye particles 70 may be black dye particles, but are not limited thereto.

A reflective polarizer POL may be disposed outside the first substrate 500. The reflective polarizer POL transmits the light in a first direction, and reflects the light in a second direction different the first direction. In one embodiment, for example, the reflective polarizer POL may have a transmission axis in a predetermined direction to transmit the light vibrating in the first direction (e.g., a component of the light in the first direction) and a reflection axis in a predetermined direction to reflect the light vibrating in the second direction different from the first direction (e.g., a component of the light in the second direction). In such an embodiment, the first direction and the second direction may be orthogonal to each other. In one embodiment, for example, the first direction may be at 0° with a reference direction, and the second direction may be at 90° with the reference direction. In one alternative embodiment, for example, the first direction may be at 90° with the reference direction, and the second direction may be at 0° with the reference direction.

Therefore, in the light provided from the backlight unit BLU to be described later, only the light vibrating in the first direction may pass through the reflective polarizer POL, and may be provided to the liquid crystal layer LC. The light provided to the liquid crystal layer LC may be emitted to the outside, or may be absorbed in the dichroic dye particles 70 disposed in the liquid crystal layer LC. A detailed description thereof will be described later.

The backlight unit BLU may be disposed outside the first substrate 500. In an embodiment, the backlight unit BLU may be disposed outside (e.g., below) the reflective polarizer POL. In such an embodiment, the reflective polarizer POL may be disposed between the first substrate 500 and the backlight unit BLU.

The backlight unit BLU may be classified as a direct backlight unit or a photometric backlight unit. The direct backlight unit may be configured in a way such that a light source, e.g., a lamp, disposed just under the display panel irradiates light to the display panel, and the photometric backlight unit may be configured to transfer the laterally-applied light to the display panel through a light guide plate. In an embodiment, the backlight unit may be any one of the above two types of back light units, but not being limited thereto.

The backlight unit BLU provides light to the inside of the display panel, and the provided light is emitted to the outside of the second substrate 1000, s to display an image.

A light absorbing layer BS may be disposed outside, e.g., below, the backlight unit. The light absorbing layer BS may absorb the external light that has passed through the reflective polarizer POL. In such an embodiment, the light absorbing layer BS may absorb the light that has been provided from the backlight unit BLU and then reflected by the reflective polarizer POL.

In such an embodiment, where the light absorbing layer BS is disposed outside the backlight unit BLU, the light absorbing layer BS absorbs a part of the reflected or transmitted light, to prevent the light other than light used to display an image to influence the image. In such an embodiment, where the light absorbing layer BS is disposed outside the backlight unit BLU, the contrast ration of the image displayed in the display device may be improved.

Hereinafter, the alignment of the liquid crystal molecules 80 and dichroic dye particles 70 in the liquid crystal display according to an embodiment of the invention will be described with reference to FIG. 2.

Figure 2:
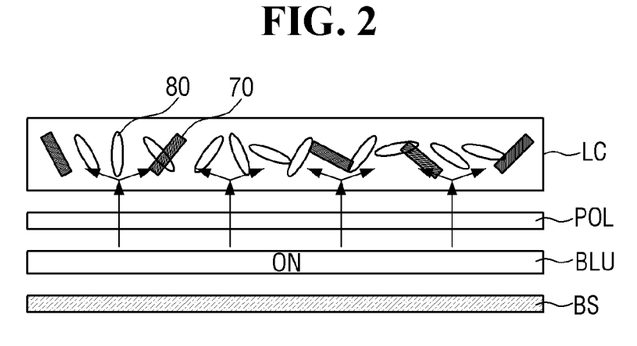
FIG. 2 is a cross-sectional view showing a driving operation of the liquid crystal display of FIG. 1.

Referring to FIG. 2, in the initial state, the liquid crystal molecules 80 and dichroic dye particles 70 in the liquid crystal layer LC may be arranged at random. For the convenience of description, several terms will be defined as follows. The term "initial state" herein means a state in which an electric field is not generated in the liquid crystal layer LC.

The term "transmission mode" means a mode in which the backlight unit BLU in turned on to provide light from the backlight unit BLU to the display panel and an image is displayed by the light.

The term "reflection mode" means a mode in which the backlight unit BLU is turned off to provide external light to the liquid crystal layer LC, and an image is displayed by the external light.

FIG. 2 illustrates the liquid crystal display which realizes black gradation in the transmission mode.

As shown in FIG. 2, in the initial state, the liquid crystal molecules 80 and dichroic dye particles 70 in the liquid crystal layer LC may be arranged at random. For the convenience of description, a state in which the liquid crystal molecules 80 and dichroic dye particles 70 are arranged at random will be referred to as "first arrangement state". In such an embodiment, where the alignment film is not disposed on the first substrate 500 as described above, the first arrangement state may be corresponding to the random arrangement of the liquid crystal molecules 80 and dichroic dye particles 70.

When the backlight unit BLU is turned on in a state where the liquid crystal molecules 80 and dichroic dye particles 70 in the liquid crystal layer LC are arranged at random, light may be provided to the display panel from the backlight unit BLU. The light provided from the backlight unit BLU may be applied to the reflective polarizer POL. When the light is applied to the reflective polarizer POL, the light vibrating in the first direction may passes through the reflective polarizer POL to be provided to the liquid crystal layer LC, and the light vibrating in other directions is reflected to be applied toward the backlight unit BLU again. In such an embodiment, at least a part of the reflected light reaches the light absorbing layer BS to be absorbed.

The light provided to the liquid crystal layer LC may collide with the liquid crystal molecules 80 arranged at random to be scattered. The light scattered by the liquid crystal molecules 80 may be absorbed in the dichroic dye particles 70. In such an embodiment, when the dichroic dye particles 70 are arranged at random in the liquid crystal layer LC, the light scattered by the liquid crystal molecules 80 is completely or effectively absorbed in the dichroic dye particles 70, and thus the light provided from the backlight unit BLU may not be emitted to the outside of the second substrate 1000. Accordingly, the liquid crystal display may realize black gradation in the transmission mode.

In such an embodiment, even when an upper polarizer is not additionally disposed outside the second substrate 1000, a black screen may be realized by only the liquid crystal molecules 80 and dichroic dye particles 70 arranged at random. Therefore, the cost for forming the upper polarizer may be saved.

Figure 3:
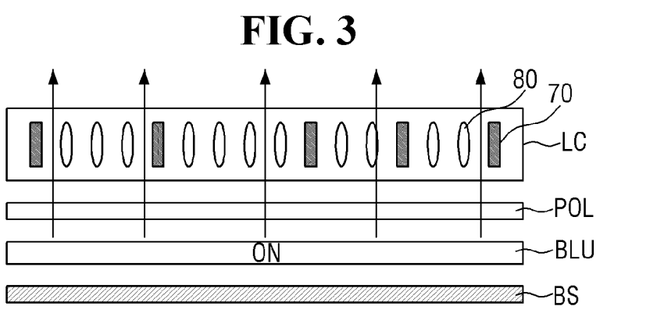
FIG. 3 is a cross-sectional view showing a driving operation of the liquid crystal display of FIG. 1.

FIG. 3 illustrates an embodiment of the liquid crystal display that realizes white gradation in the transmission mode.

Referring to FIG. 3, when an electric field is generated in the liquid crystal layer LC, the liquid crystal molecules 80 and the dichroic dye particles 70 are arranged in a direction perpendicular to the reflective polarizer POL. For the convenience of description, the state in which the liquid crystal molecules 80 and the dichroic dye particles 70 are arranged in a direction perpendicular to the reflective polarizer POL will be referred to as "second arrangement state". When the liquid crystal molecules 80 and the dichroic dye particles 70 are arranged in a direction perpendicular to the reflective polarizer POL, external light may reach the reflective polarizer POL. In the external light, the light vibrating in the second direction is reflected to be provided to the liquid crystal layer LC. The light provided to the liquid crystal layer LC in the second direction passes through the vertically aligned liquid crystal layer LC to be emitted to the outside of the liquid crystal display. Therefore, the liquid crystal display may realize white gradation. In such an embodiment, the light is reflected by the reflective polarizer POL to be emitted to the outside without using an additional upper polarizer. In such an embodiment, since the light passing through one polarizer is directly emitted to the outside, the liquid crystal display has higher transmittance compared to a conventional liquid crystal display where two polarizers are used, and thus the screen brightness of the liquid crystal display may be improved.

Figure 4:
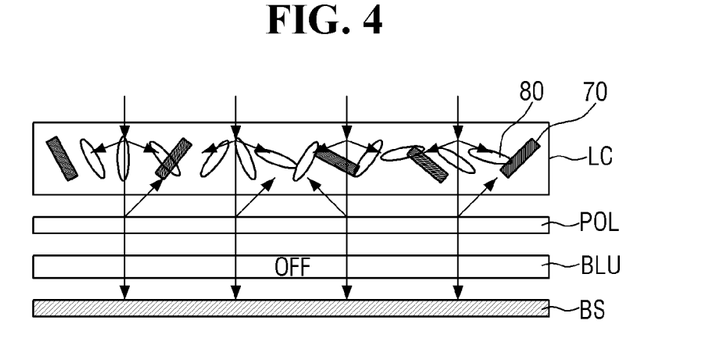
FIG. 4 is a cross-sectional view showing a driving operation of the liquid crystal display of FIG. 1.

FIG. 4 illustrates an embodiment of the liquid crystal display that realizes black gradation in the reflection mode.

As described above, the reflection mode is a mode of displaying an image using external light. In the reflection mode, the backlight unit BLU is turned off, and light is not provided the display panel.

As described above, in the initial state, the liquid crystal molecules 80 and the dichroic dye particles 70 may be arranged at random. As shown in FIG. 4, when external light is provided to the liquid crystal layer LC in a state where the liquid crystal molecules 80 and the dichroic dye particles 70 are arranged at random, the external light may collide with the liquid crystal molecules 80 to be scattered. The light scattered by the collision with the liquid crystal molecules 80 may be absorbed in the dichroic dye particles 70. A part of the light scattered by the collision with the liquid crystal molecules 80 may be applied to the reflective polarizer POL. In the light applied to the reflective polarizer POL, the light vibrating in the second direction is reflected again to be applied to the liquid crystal layer LC. The light applied to the liquid crystal layer LC by reflection again collides with the liquid crystal molecules 80 to be scattered, and the scatter light may be absorbed in the dichroic dye particles 70 again.

In the external light applied to the reflective polarizer POL, the light vibrating in the first direction passes through the reflective polarizer POL to reach the light absorbing layer BS, and the light reaching the light absorbing layer BS may be absorbed in the light absorbing layer BS.

In such an embodiment, as described above, when the liquid crystal molecules 80 and the dichroic dye particles 70 are arranged at random, the external light may be absorbed in the dichroic dye particles 70, and may not be emitted to the outside of the liquid crystal layer LC. Accordingly, the liquid crystal display may realize black gradation in the reflection mode.

In such an embodiment, even when an upper polarizer is not additionally disposed outside the second substrate 1000, a black screen may be realized by the liquid crystal molecules 80 and dichroic dye particles 70 arranged at random. Therefore, the cost for forming the upper polarizer may be saved, such that the manufacturing cost for the liquid crystal display may be reduced.

Figure 5:
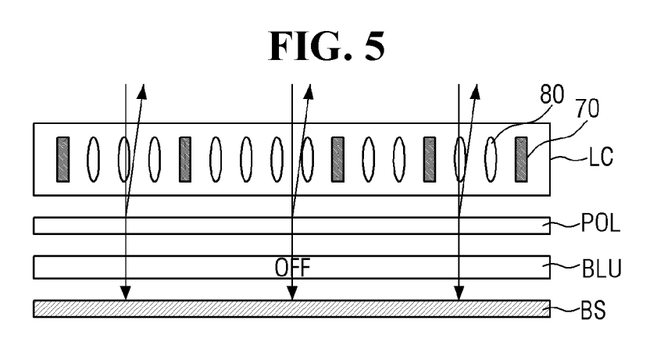
FIG. 5 is a cross-sectional view showing g a driving operation of the liquid crystal display of FIG. 1.

FIG. 5 illustrates an embodiment of the liquid crystal display that realizes white gradation in the reflection mode.

As shown in FIG. 5, when an electric field is generated in the liquid crystal layer LC, the liquid crystal molecules 80 and the dichroic dye particles 70 are arranged in a direction perpendicular to the reflective polarizer POL. When the liquid crystal molecules 80 and the dichroic dye particles 70 are arranged in a direction perpendicular to the reflective polarizer POL, external light may reach the reflective polarizer POL. In the external light, the light vibrating in the second direction is reflected to be provided to the liquid crystal layer LC. The light provided to the liquid crystal layer LC in the second direction passes through the vertically aligned liquid crystal layer LC to be emitted to the outside of the liquid crystal display. Therefore, the liquid crystal display may realize white gradation in the reflection mode. In such an embodiment, the light is reflected by the reflective polarizer POL to be emitted to the outside without using an additional upper polarizer. In such an embodiment, since the light passing through one polarizer is directly emitted to the outside, the liquid crystal display has higher transmittance compared to a conventional liquid crystal display where two polarizers are used, and thus the screen brightness of the liquid crystal display may be improved.

Figure 6:
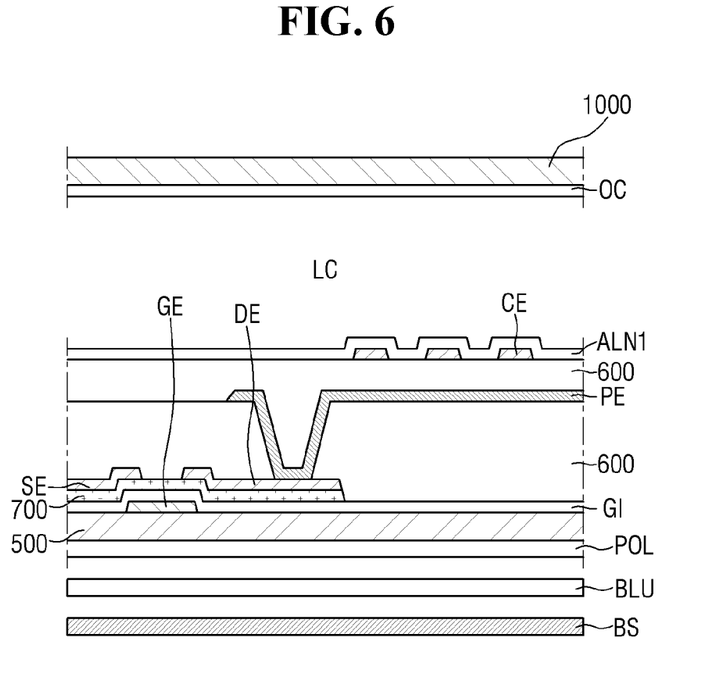
FIG. 6 is a cross-sectional view of a liquid crystal display according to an alternative embodiment of the invention.

FIG. 6 is a schematic cross-sectional view of a liquid crystal display according to an alternative embodiment of the invention. FIGS. 7 to 10 are cross-sectional views showing a driving operation of the liquid crystal display of FIG. 6.

Referring to FIG. 6, an alternative embodiment of the liquid crystal display may be a plane to line switching ("PLS") type liquid crystal display.

The backlight unit BLU, reflective polarizer POL and light absorbing layer in the liquid crystal display of FIG. 6 are substantially the same as those in embodiments of the liquid crystal display described above with reference to FIGS. 1 to 5, and any repetitive detailed descriptions thereof will hereinafter be omitted.

In such an embodiment, the gate electrode GE, gate insulating film GI, semiconductor pattern layer 700, source electrode SE, drain electrode DE, first passivation film 600, and pixel electrode PE, which are sequentially disposed on the first substrate 500, are substantially the same as those described above with reference to FIG. 1, and any repetitive detailed description thereof will hereinafter be omitted.

In an embodiment, as shown in FIG. 6, a second passivation film 650 may be disposed on the pixel electrode PE.

The second passivation film 650 may include or be made of at least one selected from silicon oxide, silicon nitride, silicon oxynitride, aluminum oxynitride, titanium oxynitride, zirconium oxynitride, hafnium oxynitride, tantalum oxynitride and tungsten oxynitride.

A common electrode CE may be disposed on the second passivation film 650. The common electrode CE may have a slit pattern, and at least a part of the common electrode CE may overlap the pixel electrode PE. When a voltage is applied to the common electrode CE and the pixel electrode PE, a horizontal electric field is generated between the common electrode CE and the pixel electrode PE, and the liquid crystal molecules disposed on the common electrode CE may be controlled, e.g., aligned in response to the horizontal electric filed.

In such an embodiment, where the common electrode CE is disposed over the first substrate 500 as shown in FIG. 6, the common electrode may not be disposed on the second substrate 1000. However, in an alternative embodiment, a common electrode having a slit pattern may be disposed between the first substrate 500 and the second substrate 1000. In such an embodiment, liquid crystal molecules 80 and dichroic dye particles 70, which are vertically aligned by an alignment film, may be arranged at random, as will be described later.

In such an embodiment a structure for forming a horizontal electric field may be disposed on at least one of the first substrate 500 and the second substrate 1000.

Hereinafter, an embodiment where a horizontal electric field is generated on the first substrate 500 will be described in detail.

In an embodiment, as shown in FIG. 6, an alignment film ALN may be disposed. In such an embodiment, the alignment film ALN may be disposed on the common electrode CE. The alignment film ALN, which determines the initial alignment of the liquid crystal molecules 80 disposed between the first substrate 500 and the second substrate 1000, may include a polymer material causing one reaction of decomposition, dimerization and isomerization by irradiation with light (for example, ultraviolet ("UV") or laser). In an embodiment, the alignment film ALN may include or be made of a polymer produced by the polymerization of reactive mesogen.

In an embodiment, the alignment film ALN may be a photo-alignment film. The term "photo-alignment film" herein refers to an alignment film obtained by aligning liquid crystal molecules in an optical manner, not a mechanical manner (rubbing or the like), in the initial alignment of the liquid crystal molecules. In the photo-alignment film, directionality may be imparted to the alignment film by irradiating the photo-alignment film with UV or laser.

In an alternative embodiment, the alignment film ALN may be an alignment film obtained by aligning liquid crystal molecules in a mechanical manner, that is, in a rubbing manner.

In an embodiment, as shown in FIG. 6, liquid crystal molecules 80 and dichroic dye particles 70 may be disposed on the alignment film ALN. In such an embodiment, the liquid crystal molecules 80 and dichroic dye particles 70 in the initial state may be vertically aligned. In such an embodiment, the liquid crystal molecules 80 and the dichroic dye particles 70 may be arranged in a direction perpendicular to the reflective polarizer POL in the initial state.

Hereinafter, the driving operation of the liquid crystal display of FIG. 6 will be described in detail with reference to FIGS. 7 to 10.

Figure 7:
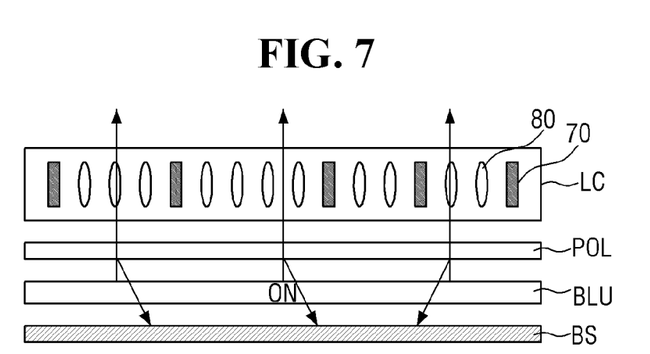
FIG. 7 is a cross-sectional view showing a driving operation of the liquid crystal display of FIG. 6.

FIG. 7 illustrates an embodiment of the liquid crystal display that realizes white gradation in the transmission mode.

In such an embodiment, as shown in FIG. 7, the liquid crystal molecules 80 and dichroic dye particles 70 in the liquid crystal layer LC may be vertically arranged in the initial state, since the liquid crystal molecules 80 and the dichroic dye particles 70 are vertically arranged by the alignment film ALN disposed on the first substrate 500 as described above.

When the backlight unit BLU is turned on in a state where the liquid crystal molecules 80 and dichroic dye particles 70 in the liquid crystal layer LC vertically are arranged, light may be provided to the display panel from the backlight unit BLU. The light provided from the backlight unit BLU may be applied to the reflective polarizer POL. When the light is applied to the reflective polarizer POL, the light vibrating in the first direction may passes through the reflective polarizer POL to be provided to the liquid crystal layer LC, and the light vibrating in other directions is reflected to be applied toward the backlight unit BLU again. In such an embodiment, as shown in FIG. 7, when the light vibrating in other directions is reflected by the reflective polarizer POL, at least a part of the reflected light reaches the light absorbing layer BS to be absorbed.

The light provided to the liquid crystal layer LC passes through the vertically arranged liquid crystal molecules 80 and dichroic dye particles 70 to be emitted to the outside of the liquid crystal display. Therefore, the liquid crystal display may realize white gradation in the transmission mode. In such an embodiment, the light passes through only the reflective polarizer POL to be emitted to the outside without using an additional upper polarizer. In such an embodiment, since the light passing through one polarizer is directly emitted to the outside, the liquid crystal display has higher transmittance compared to a conventional liquid crystal display where two polarizers are used, and thus the screen brightness of the liquid crystal display may be improved.

Figure 8:
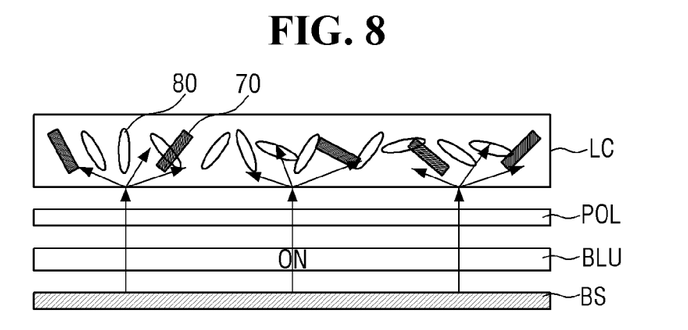
FIG. 8 is a cross-sectional view showing a driving operation of the liquid crystal display of FIG. 6.

FIG. 8 illustrates a case that the liquid crystal display according to another embodiment realizes black gradation in the transmission mode.

Referring to FIG. 8, as described with reference to FIG. 6, a horizontal electric field may be generated in the liquid crystal layer LC. When the horizontal electric field is generated in the liquid crystal layer LC, liquid crystal molecules 80 and dichroic dye particles 70 may be arranged at random. When the liquid crystal molecules 80 and the dichroic dye particles 70 are arranged at random, the light provided to the liquid crystal layer LC from the backlight unit BLU collides with the liquid crystal molecules 80 arranged at random to be scattered.

The light scattered by the liquid crystal molecules 80 may be absorbed in the dichroic dye particles 70. In such an embodiment, when the dichroic dye particles 70 are arranged at random in the liquid crystal layer LC, the light scattered by the liquid crystal molecules 80 is completely or effectively absorbed in the dichroic dye particles 70, and thus the light provided from the backlight unit BLU may not be emitted to the outside of the second substrate 1000. Accordingly, the liquid crystal display may realize black gradation.

In an embodiment of the liquid crystal display according to the invention, even when an upper polarizer is not additionally disposed outside the second substrate 1000, a black screen may be realized by only the liquid crystal molecules 80 and dichroic dye particles 70 arranged at random. Therefore, the cost for forming the upper polarizer may be saved.

Figure 9:
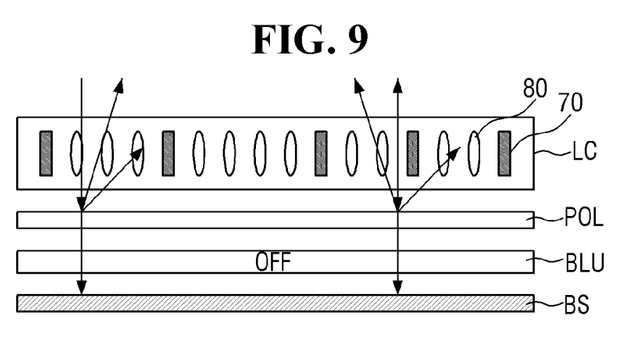
FIG. 9 is a cross-sectional view showing a driving operation of the liquid crystal display of FIG. 6.

FIG. 9 illustrates an embodiment of the liquid crystal display that realizes white gradation in the reflection mode.

As described above, the reflection mode is a mode of displaying an image using external light. When the liquid crystal display is in the reflection mode, the backlight unit BLU is turned off, and light is not provided to the display panel.

Referring to FIG. 9, liquid crystal molecules 80 and dichroic dye particles 70 may be vertically arranged in the initial state. In such an embodiment, when the liquid crystal molecules 80 and the dichroic dye particles 70 are vertically arranged, external light may reach the reflective polarizer POL. In the external light, the light vibrating in the second direction is reflected to be provided to the liquid crystal layer LC. The light provided to the liquid crystal layer LC in the second direction passes through the vertically aligned liquid crystal layer LC to be emitted to the outside of the liquid crystal display. Therefore, the liquid crystal display may realize white gradation.

In such an embodiment, a part of the external light reaching the reflective polarizer POL passes through the reflective polarizer POL and reaches the light absorbing layer BS to be absorbed in the light absorbing layer BS.

In such an embodiment, the light is reflected by the reflective polarizer POL to be emitted to the outside without using an additional upper polarizer. In such an embodiment, since the light passing through one polarizer is directly emitted to the outside, the liquid crystal display has higher transmittance compared to a conventional liquid crystal display where two polarizers are used, and thus the screen brightness of the liquid crystal display may be improved.

Figure 10:
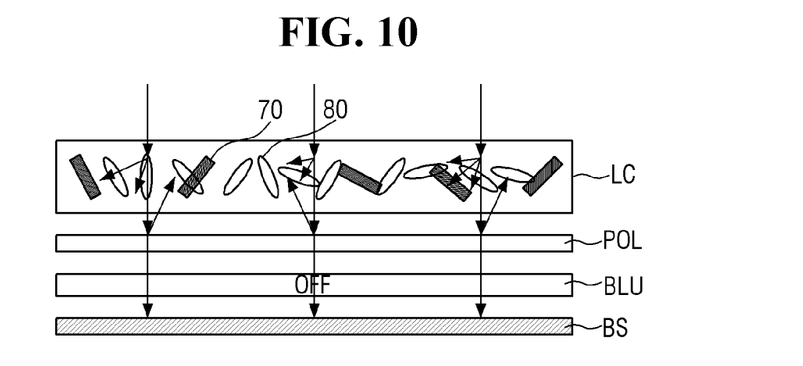
FIG. 10 is a cross-sectional view showing a driving operation of the liquid crystal display of FIG. 6.

FIG. 10 illustrates an embodiment of the liquid crystal display that realizes black gradation in the reflection mode.

Referring to FIG. 10, in such an embodiment, a horizontal electric field may be generated in the liquid crystal layer LC, as described with reference to FIG. 6. When the horizontal electric field is generated in the liquid crystal layer LC, liquid crystal molecules 80 and dichroic dye particles 70 may be arranged at random. When the liquid crystal molecules 80 and the dichroic dye particles 70 are arranged at random, the external light provided to the liquid crystal layer LC collides with the liquid crystal molecules 80 arranged at random to be scattered.

The light scattered by the liquid crystal molecules 80 may be absorbed in the dichroic dye particles 70. In such an embodiment, when the dichroic dye particles 70 are arranged at random in the liquid crystal layer LC, the light scattered by the liquid crystal molecules 80 is completely or effectively absorbed in the dichroic dye particles 70, and thus the light may not be emitted to the outside of the second substrate 1000. In such an embodiment, the liquid crystal display may realize black gradation.

In an embodiment of the liquid crystal display where an upper polarizer, which is conventionally provided outside the second substrate 1000, is omitted, a black screen may be realized by only the liquid crystal molecules 80 and dichroic dye particles 70 arranged at random. Therefore, the cost for forming the upper polarizer may be saved.

As described above, according to embodiments of the invention, black gradation may be realized by using only a reflective polarizer without an upper polarizer. In such embodiment, as described herein, the transmittance of a liquid crystal display is improved, and the manufacturing cost of a liquid crystal display may be reduced.

Although some embodiments of the invention have been disclosed for illustrative purposes, those skilled in the art will appreciate that various modifications, additions and substitutions are possible, without departing from the scope and spirit of the invention as disclosed in the accompanying claims.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid crystal display, comprising:
   a display panel comprising:
   a first substrate;
   a second substrate disposed opposite to the first substrate; and
   a liquid crystal layer disposed between the first substrate and the second substrate;
   a reflective polarizer disposed outside the first substrate; and
   a backlight unit disposed outside the first substrate to provide light to the display panel,
   wherein
   the liquid crystal layer comprises liquid crystal molecules and dichroic dye molecules,
   when the liquid crystal layer has a first arrangement state in which the liquid crystal molecules and the dichroic dye molecules are arranged at random, and the light from the backlight unit provided to the display panel to display an image passes through only one polarizer being the reflective polarizer.

2. The liquid crystal display of claim 1,
wherein the display panel realizes a black gradation when the backlight unit is turned on in the first arrangement state.

3. The liquid crystal display of claim 1,
wherein the display panel realizes a black gradation when the backlight unit is turned off in the first arrangement state.

4. The liquid crystal display of claim 1,
wherein the liquid crystal layer has a second arrangement state in which the liquid crystal molecules and the dichroic dye molecules are arranged vertically.

5. The liquid crystal display of claim 4,
wherein the display panel realizes a white gradation when the backlight unit is turned on in the second arrangement state.

6. The liquid crystal display of claim 4,
wherein the display panel realizes a white gradation when the backlight unit is turned off in the second arrangement state.

7. The liquid crystal display of claim 4,
wherein the liquid crystal layer is in the first arrangement state when an electric field is not generated in the liquid crystal layer.

8. The liquid crystal display of claim 7,
wherein the liquid crystal layer is converted into the second arrangement state when an electric field is generated in the liquid crystal layer.

9. The liquid crystal display of claim 4, further comprising:
an alignment film disposed on the first substrate.

10. The liquid crystal display of claim 9,
the liquid crystal layer is in the second arrangement state when an electric field is not generated in the liquid crystal layer.

11. The liquid crystal display of claim 10,
wherein the liquid crystal layer is converted into the first arrangement state when a horizontal electric field is generated in the liquid crystal layer.

12. The liquid crystal display of claim 1,
wherein the reflective polarizer transmits light vibrating in a first direction, and reflects light vibrating in a second direction different from the first direction.

13. The liquid crystal display of claim 12,
wherein the first direction and the second direction are orthogonal to each other.

14. The liquid crystal display of claim 1, further comprising:
a light absorbing layer disposed outside the backlight unit.

15. The liquid crystal display of claim 1,
wherein the dichroic dye particles comprise black dye particles.

\* \* \* \* \*